United States Patent
Tsengas

(10) Patent No.: US 8,381,687 B2
(45) Date of Patent: *Feb. 26, 2013

(54) SELF SCOOPING CAT LITTER BOX

(75) Inventor: Steven Tsengas, Fairport Harbor, OH (US)

(73) Assignee: OurPet's Company, Fairport Harbor, OH (US)

( * ) Notice: Subject to any disclaimer, the term of this patent is extended or adjusted under 35 U.S.C. 154(b) by 459 days.

This patent is subject to a terminal disclaimer.

(21) Appl. No.: 12/631,986

(22) Filed: Dec. 7, 2009

(65) Prior Publication Data

US 2011/0017142 A1    Jan. 27, 2011

Related U.S. Application Data

(63) Continuation-in-part of application No. 12/175,612, filed on Jul. 18, 2008, now Pat. No. 7,628,118, which is a continuation of application No. 11/708,368, filed on Feb. 20, 2007, now abandoned.

(60) Provisional application No. 60/819,906, filed on Jul. 12, 2006.

(51) Int. Cl.
*A01K 29/00* (2006.01)

(52) U.S. Cl. ..................................... 119/166

(58) Field of Classification Search ............... 119/163, 119/165, 166, 168
See application file for complete search history.

(56) References Cited

U.S. PATENT DOCUMENTS

| | | | |
|---|---|---|---|
| 5,226,388 A | 7/1993 | McDaniel | |
| 5,272,999 A | 12/1993 | Nussle | |
| 5,326,117 A * | 7/1994 | Cook | 280/79.2 |
| 5,477,812 A | 12/1995 | Waters | |
| 5,544,620 A | 8/1996 | Sarkissian | |
| 5,662,066 A | 9/1997 | Reitz | |
| 5,823,137 A | 10/1998 | Rood et al. | |
| 5,931,119 A | 8/1999 | Nissim et al. | |
| 6,082,302 A | 7/2000 | Thaler et al. | |
| 6,202,595 B1 | 3/2001 | Atcravi | |
| 6,205,954 B1 | 3/2001 | Bogaerts | |
| 6,401,661 B1 | 6/2002 | Emery | |
| 6,494,165 B2 | 12/2002 | Asbury | |
| 6,568,348 B1 | 5/2003 | Bedard | |
| 2003/0217700 A1 | 11/2003 | Northrop et al. | |

* cited by examiner

*Primary Examiner* — Kimberly Berona
(74) *Attorney, Agent, or Firm* — John D. Gugliotta, Esq.; Nicholas A. Mihalic, Esq.; Howard L. Wernow, Esq.

(57) ABSTRACT

An automated cat litter box comprising self-scooping mechanisms on a scooping carriage assembly at one end of a litter pan. The scooping carriage contains therein a waste drawer having a removable tray covered in lining. The tray travels with the carriage to the opposing end of the litter so that a grate can flip backwards to shovel collected waste into the waste drawer.

8 Claims, 4 Drawing Sheets

SELF SCOOPING CAT LITTER BOX

RELATED APPLICATIONS

The present invention is a Continuation in Part of U.S. Ser. No. 12/175,612, filed on Jul. 18, 2008 now U.S. Pat. 7,628,118 and which claims benefit of U.S. Provisional Patent Application 60/819,906 filed on Jul. 12, 2006 and is a Continuation of U.S. Ser. No. 11/708,368 filed on Feb. 20, 2007 now abandoned.

BACKGROUND OF THE INVENTION

1. Field of the Invention

The present invention relates generally to an automated cat litter box and, more particularly, to a conventional covered litter box pan having all of its self-scooping components comprised at one end on a cleaning carriage assembly that retrieves clumped litter.

2. Description of the Related Art

It is important to routinely clean litter boxes so that cat's don't track clumped waste throughout the home and malicious odors caused by waste don't spread. The number and the variety of automated litter box designs on the market suggest that cleaning the box is a dreaded chore to even the most avid cat enthusiast. These litter boxes typically comprise a means for separating the waste clumps from the litter granules so that little maintenance is required to keep the box clean. A search of the prior art did not disclose any patents that read directly on the claims of the instant invention; however, the following references were considered related.

Of considerable relevance is the animal waste disposal system disclosed in U.S. Pat. No. 6,202,595 to Atrcravi, which comprises a drive mechanism that collects waste in a scoop and moves it to a container attached to a removable drawer having two handles so that it can be easily discarded. The device taught in U.S. Pat. No. 6,205,954 to Bogaerts comprises a comb mounted to a movable carriage that pushes waste to a receiving container having a cover lid. The waste container can also be taken off for emptying.

The self-cleaning litter box taught in U.S. Application No. 2003/0217700 to Northrop et al. comprises rake tines that push clumps upward along an inclined ramp to a waste box having an open lid to receive the clumps. The waste, box is fitted with a removable tray and a disposable liner so that the container can be emptied easily.

The disposal system taught in U.S. Pat. No. 5,226,388 to McDaniel comprises a rigid scoop extending across the width of the pan that travels along a set of parallel tracks extending along the sidewalls to move clumped waste to a receptacle in the form of a trash bag.

The improved automated self-cleaning litter box disclosed in U.S. Pat. Nos. 6,082,302 to Thaler et al. and 5,477,812 to Waters both comprise an open disposal receptacle at the discharge end of the litter chamber. The self-cleaning cat box taught in U.S. Pat. No. 5,544,620 comprises a storage compartment having a scraper that prevents the waste from leaving the area.

The litter box and pivotal sifting device taught in U.S. Pat. No. 5,823,137 to Rood et al. comprises a sifting device disposed beneath a layer of litter that pivotally moves up through the litter to deliver the waste to a disposal site.

The litter boxes disclosed in U.S. Pat. Nos. 6,494,165 to Asbury and 5,272,999 to Nussle both comprise a sifting screen that divides the litter box into different compartments. The boxes must be tilted for the clumps to be separated from the litter and stored in one of the compartments.

The self cleaning pet litter boxes disclosed in U.S. Pat. No. 6,568,348 to Bédard, U.S. Pat. No. 6,401,661 to Emery, U.S. Pat. No. 5,931,119 to Nissim et al, U.S. Pat. No. 5,662,066 to Reitz and U.S. Pat. No. 5,107,797 all comprise a litter container, a raking mechanism and a motor. A distinguishing feature to these inventions is that the motors rotate the litter containers so that the rake can separate the clumps.

While some of the features may be incorporated into this invention in combination, other elements are different enough as to make the combination distinguished over the prior art. More specifically, the present invention eliminates the bulky and the inconvenient designs common to many automated litter boxes. The raking, the motor and the receptacle components disclosed in the prior art are all positioned in various locations of the box; they limit the litter space available to the cat. In the present invention, the waste is scooped and retrieved to a waste container. The waste container, the rotatable grate and the motor mechanism are all contained on a carriage positioned within and on one end of a conventional rectangular litter pan. The waste container is later removed by users. These features make this litter a convenient and a cost efficient one for consumers.

Consequently, a need has been long felt for providing an improved automated litter box and a system for cleaning the same that requires little to no maintenance, but at the same time, one having a carriage assembly that is neither complex, space consuming nor expensive.

SUMMARY OF THE INVENTION

It is an object of the present invention to provide an improved automated cat litter box and, more specifically, a litter box having all of its self-cleaning components comprised on a cleaning carriage at its one end.

It is a feature of the present invention to position a carriage assembly comprising a rotatable grate, a driving mechanism and a waste container at one of the litter pan's distal ends.

One advantage to the present invention is that most of the pan's litter containing space is preserved for the cat while the automated cleaning components rest at the opposite end from where the cat ingresses the box.

It is another feature of the present invention to include a ramp having horizontal ribs to catch any litter caught on the cat's paw while it egresses the box so that litter is not tracked throughout the house.

It is another feature of the present invention to include a waste container comprising a removable tray that fits into a drawer so that the entire waste receptacle does not need to be removed for waste to be discarded.

It is another feature of the present invention to include a litter box cover that is designed to accommodate the litter box's construction. One advantage to the litter box cover is that it can be easily placed on and removed from the pan. Furthermore, no housing is required to support the scooping mechanism; hence, the scooping mechanism can mount directly to the pan.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTION OF THE PREFERRED EMBODIMENTS

Figure 1:
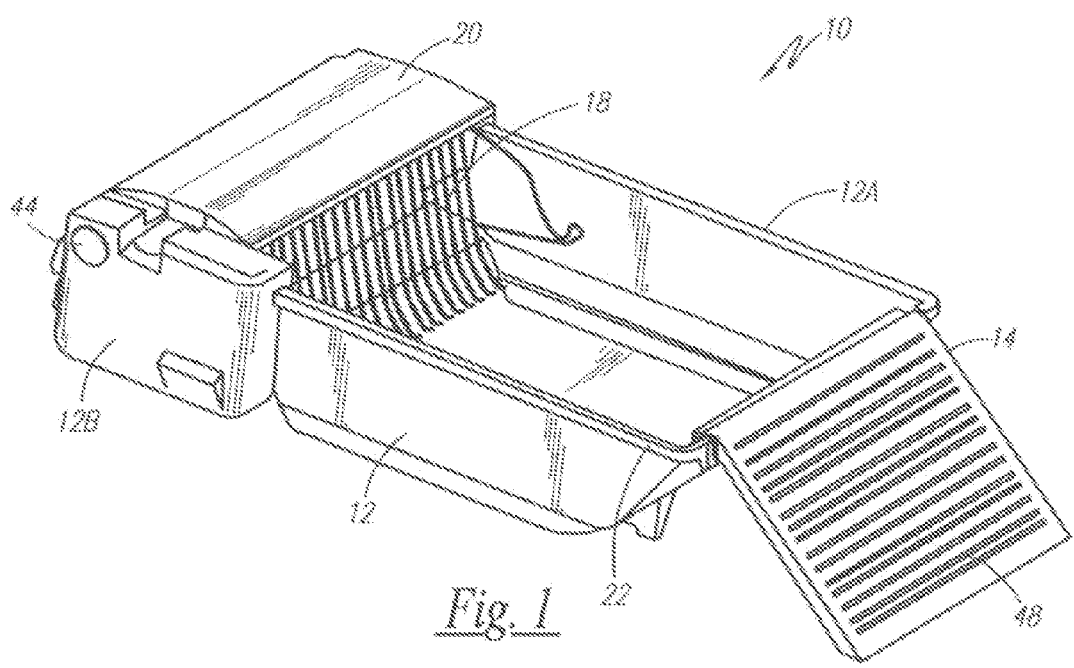
FIG. 1 is an elevational view of a self-scooping cat litter box according to a preferred embodiment of the present invention.
Figure 2:
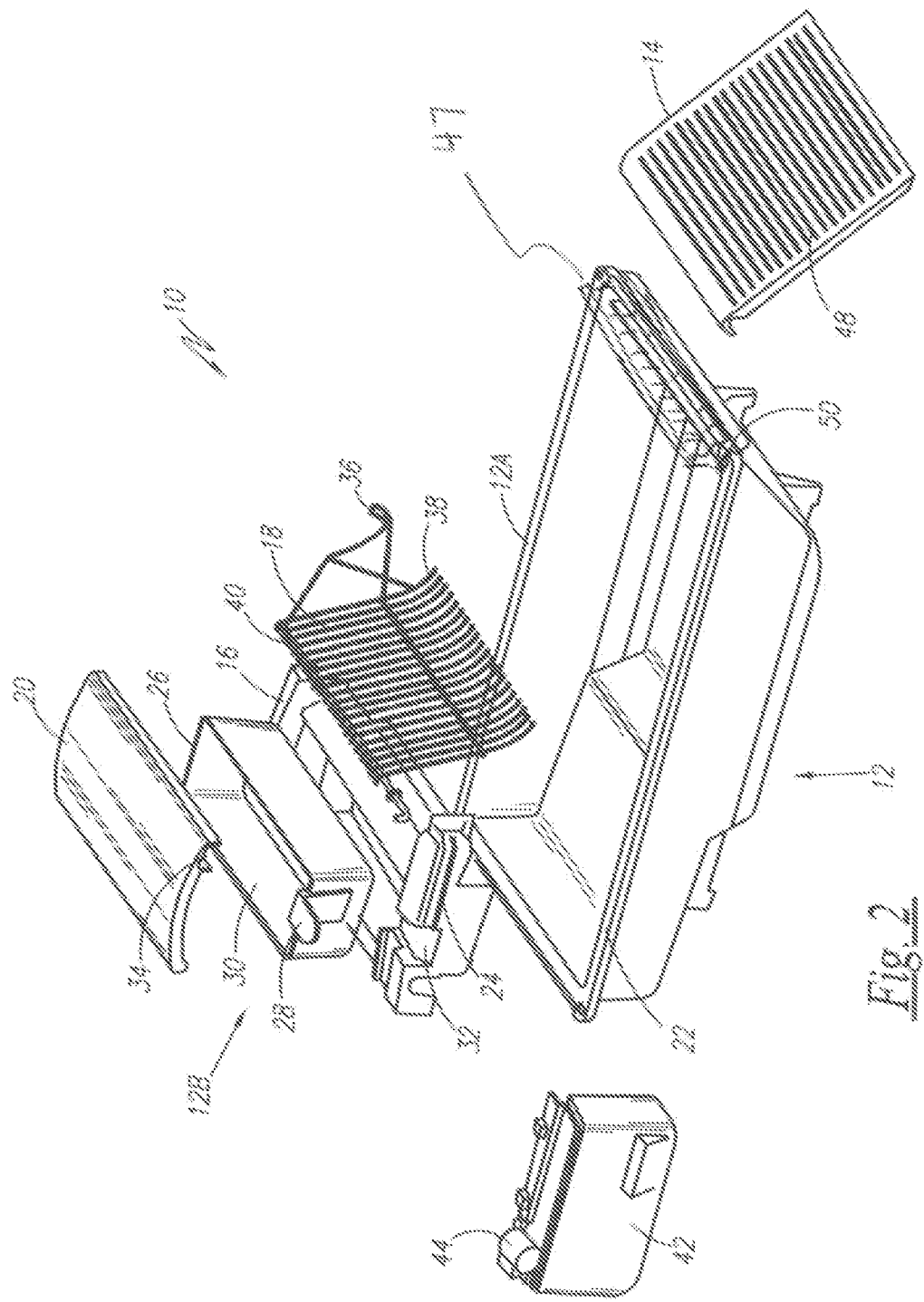
FIG. 2 is an elevational exploded view of the self-scooping cat litter box shown in FIG. 1.
Figure 3:
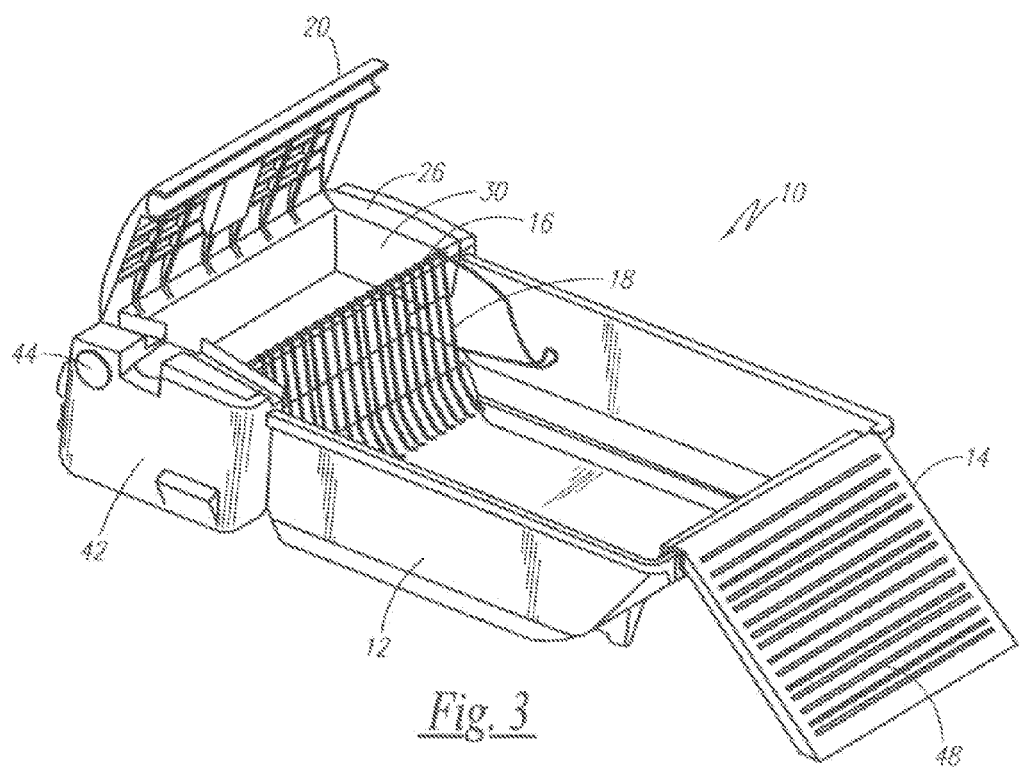
FIG. 3. is the self-scooping litter box of FIG. 1, wherein a lid to a waste drawer is opened to expose its interior.
Figure 4:
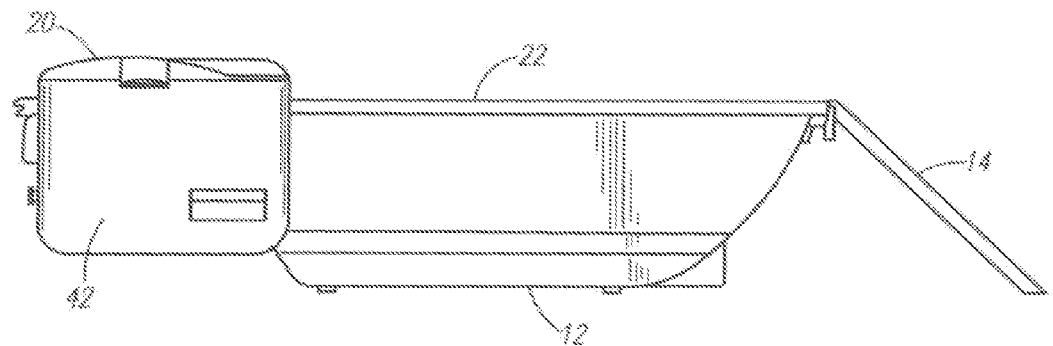
FIG. 4 is a side view of the self-scooping cat litter box.
Figure 5:
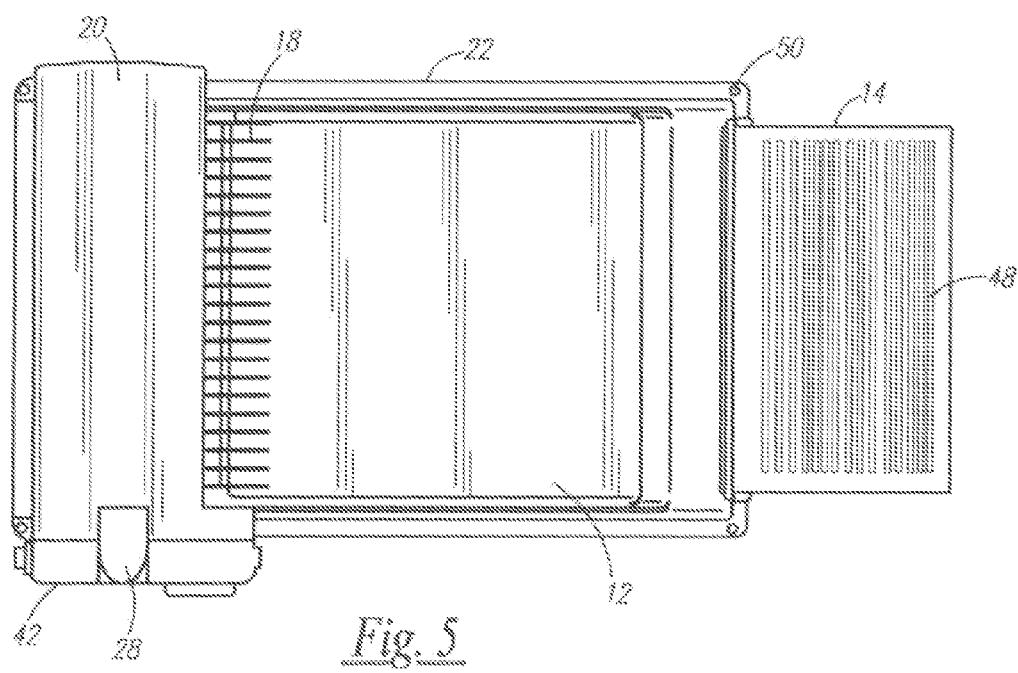
FIG. 5 is a top view of the automated cat litter box.

The best mode for carrying out the invention is presented in terms of its preferred embodiment, herein depicted within the Figures. The automated cat litter box 10 according to the preferred embodiment of the present invention is shown in FIGS. 1-3. To achieve the objectives of the present invention, the preferred embodiment comprises a deep rectangular litter pan 12a having a ramp 14 along its width at one end and a self-cleaning carriage 12b resting at the opposite end.

The self-cleaning carriage 12b preferably comprises a waste drawer 16 having a rotating grate 18 vertically attached thereto. The length of the waste drawer 16 travels along the width of the litter pan 12; its depth approximates half the depth of the litter pan 12. A lid 20 is hingedly attached to the waste drawer 16 along its length. A spring urged closing mechanism 19 is further included to provide a closing urging force on the lid 20 against the waste drawer 16.

FIG. 2 shows a tray 26 that is sized to fall into and fit into the waste drawer 16. A disposable and non-reusable plastic covering 30, or lining, is placed over the tray 26 so that waste can be speedily and easily removed. A handle 28 is positioned at the tray's 26 end so that the tray can be lifted out of the drawer 16 and the waste discarded. The handle 28 extends outwards through a window formed by a rectangular indentation 32 on the top edge of the drawer 16 and a curved indentation 34 on the edge of the lid 20 when the lid 20 is in a closed position.

The self-cleaning carriage 12b rests on the lip 22 of the pan 12 by means of an engagement rail 24. When the litter is self-cleaning, the self-cleaning carriage 12b travels along the lip 22 and also travels a guiding rim 36 extending outwards from the interior sidewall of the pan 12a. While the engagement rail 24 is carrying the entire self-cleaning carriage 12b along the length of the pan 12a, litter passes through the tines 38 of the rotating grate 18 while clumps of waste are pushed forward. The tines 38 can be straight or curved so as to better shovel the waste in the cleaning process. In the improvements of the present invention, the tines 38 have been modified slightly over those taught in the parent applications, namely, the distal ends are shortened to prevent "spearing" of waste clumps. The pan 12 has also been modified to bring the tines 38 closer to the bottom of the pan 12, there improving the cleaning/scooping action. Additionally, the bottom surface of the pan 12 has been modified to better match a radius corresponding to the rotation of the tines 38 when in action.

Towards the end of the guiding rim 36, the grate 18 rotates from its vertical position and climbs the curved shallow end of the pan 12a to a horizontal position. The grate 18 then flips backwards by means of a pivot rod 40 to shovel all of the clumped waste that the tines 38 sifted out of the litter into the tray 26 behind it. The grate 18 mechanically returns to the vertical position and the cleaning carriage 12b returns backwards along the same guiding rim 36 to its resting position.

The self-cleaning carriage 12b travels the length of the pan 12a by means of a motorized driving mechanism (not shown) housed in a cabin 42 attached to and adjacent to the drawer 16. It is envisioned that the cabin 42 is positioned outside of the litter box 10 so as to not consume any additional litter containing space in the litter pan 12a. A push lock release 44 positioned on the top of the cabin 42 provides access to the motor and the mechanical elements used to drive the cleaning carriage 12b.

In an alternate embodiment to the present invention, shown in FIG. 3, a hand crank can be used to drive the self-cleaning carriage 12b. In this embodiment, the driving mechanism is still housed in the cabin 42, but it is not motorized.

Another functional element comprised in the preferred embodiment includes horizontal ribs 48 extending across the ramp both to assist the cat in ingress and egress and to assist in catching any litter or clumps caught on the cat's paws before it is tracked throughout the home. Circular grooves 50 positioned on the lip 22 of the pan 12a at its four corners also provide a means for a litter box lid to be placed over the pan 12a. Alternately, the ramp 14, useful in aiding smaller animals to access the device, can be replaced with a soft TPE wiper 47 added to the tip of a deflector. In this position, as the tines 38 rotate upward, the tines 38 will contact the soft wiper 47, pushing waste back onto the tines. This is aimed at keeping waste inside the box, which will ultimately be transferred into the waste container 26.

It has been found that due to variations in litter material, and in conjunction with encountering clumps, the motorized drive mechanism requires increased power over what would be expected. Such increased power is developed through a number of methods. The first is the increase in power of the motor used in the motorized drive mechanism. However, such increase in power will require reinforcements to the drive mechanism. To accommodate this, the steel pins used for axles to support the gears have been changed to hardened steel material. A harder, tougher nylon gear material is also used for the several gears. It is also anticipated that sintered metal gears can also be used alternately to the hardened nylon material.

An electrical switch now monitors a "latch position". If the carriage 12b is not fully locked onto the motor, device will not operate. In addition, a gear tooth has been added to the rack that controls the tine rotation. In such a configuration, the rotation of the tines begins closer to the end of the waste tray.

2. Operation of the Preferred Embodiment

The preferred embodiment of the present invention operates by means of a single motorized driving mechanism. The operation of the device provides that the motorized scooping is actuated by a sensor and/or a person. After the cat leaves the litter box, the lid on the waste drawer opens so that clumped waste can access the tray. The engagement rails positioned on the cleaning carriage carries it down the length of the pan by means of a lip and a guiding rim positioned on the interior sidewall of the pan. As the cleaning carriage travels the pan, litter passes through the tines on a rotatable grate while clumped litter is pushed forward. A New dynamic logic that controls the motor operation will be programmed onto the IC. The program will monitor the motors performance, and will compensate for the motor & mechanism power loss. Because the depth of the drawer approximates half the depth of the pan, the litter that passes through the tines is smoothed under the pan. As the rotatable gate approaches the curved shallow end of the pan, the channel discontinues and the grate, pushed to a relatively horizontal position, mechanically shovels all of the clumped waste into the covered tray behind it. The grate returns to a vertical position and the cleaning carriage travels back to its resting position. The lid closes on the drawer so as to cover the malicious odors caused by the waste held within until the pet owner returns to lift the tray, by means of its handle, and discard the waste. The tray can be turned upside to discard the waste or the plastic covering can be removed with the waste held therein and the both discarded.

It is envisioned that a litter box lid covers the automated cat litter box during the automated cleaning process. The lid is suspended above the pan by means of four pins that snap into the corner grooves of the pan. The lid can be easily and speedily removed when the drawer needs to be accessed. In addition, the fabric cover can be removed from the frame and repeatedly washed.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents. Therefore, the scope of the invention is to be limited only by the following claims.

What is claimed is:

1. A self scooping cat litter box, comprising:
   an uncovered, deep rectangular pan;
   a scooping carriage at said pan's distal end;
   a driving mechanism to drive said scooping carriage along said pan;
   a waste drawer comprised on said scooping carriage, said waste drawer having a spring urged closing mechanism; and,
   a pivotally supported grate vertically attached to said waste drawer.

2. The self scooping cat litter box of Claim 1, wherein said waste drawer comprises:
   a hingedly attached lid;
   a spring for urging said lid closed against said waste drawer;
   a tray sized to fit into said waste drawer; and
   a disposable plastic cover or a lining placed over said tray, wherein said tray can be lifted out of said waste drawer and the waste contents therein discarded by means of an outwardly extended handle positioned on said tray.

3. The self scooping cat litter box of claim 1, wherein said litter pan further comprises:
   a shallow end at the end opposite where said scooping carriage rests,
   a guiding rim that extends outwards from the interior sidewall of said pan; and
   a resilient deflector wiper at said shallow end, said wiper deflector engaging with the distal ends of said tines as the tines rotate upward, thereby pushing waste back onto the tines.

4. A self-scooping cat litter box, comprising:
   an uncovered litter pan, said litter pan forming a cat litter receptacle for holding cat litter, said receptacle is bounded by upwardly extending sidewalls;
   a motorized carriage capable of traveling about atop of said litter pan and straddling at least one said sidewall;
   a waste drawer housing for retaining a removable waste drawer, said waste drawer housing is driven by said motorized carriage;
   a spring urged closing mechanism in contact with said waste drawer;
   a comb member pivotally supported on said waste drawer and freely hanging into said cat litter receptacle, said comb member is positioned such as when pivoted upward to be capable of guiding objects into said waste drawer;
   wherein said motorized carriage drives said waste drawer in a reciprocating fashion along said litter pan, forward to accumulate and to retrieve, and backwards to collect and to store said clumps.

5. In an improved self-scooping litter box including:
   a litter pan having a bottom and two spaced side walls each terminating at their upper end by a wall lip and connecting a storage end wall to a discharge end wall,
   the litter pan defining an upwardly open litter chamber to be filled to a given fill level with cat litter;
   the improved construction comprising:
   a waste drawer housing having a spring urged closing mechanism for retaining a removable waste drawer, said waste drawer housing being capable of transiting along said wall lips; and,
   a comb member pivotally supported on said waste drawer and freely hanging into a cat litter receptacle; and
   wherein said comb member positioned such as when pivoted upward to be capable of guiding objects into said waste drawer, wherein a motorized carriage drives said waste drawer in a reciprocating fashion along said litter pan such as to accumulate and retrieve, and back to collect and store said clumps.

6. The improved construction of claim 5, wherein said motorized carriage is capable of traveling about a top of one said sidewall.

7. The improved construction of claim 5, said improvement further comprising a carriage comb path defined on at least said one side wall.

8. The improved construction of claim 5, wherein said motorized carriage further comprises a reversible waste carriage drive motor.

* * * * *